March 5, 1963   G. W. WALDRON ETAL   3,080,215
PRODUCTION OF $Mg(OH)_2$
Filed March 11, 1960
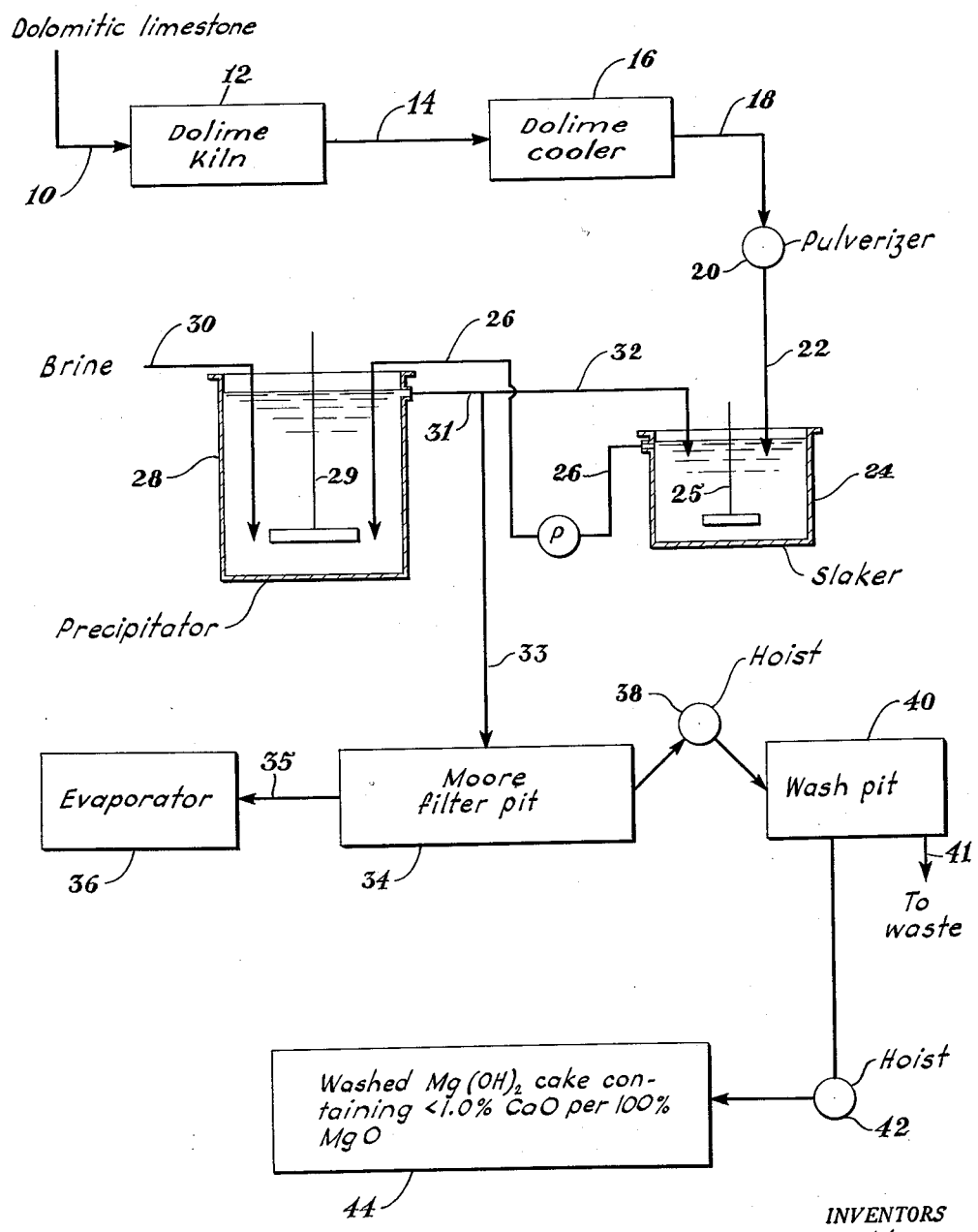
INVENTORS
George W. Waldron
John N. Periard
BY Griswold & Burdick
ATTORNEYS United States Patent Office 3,080,215
Patented Mar. 5, 1963

3,080,215
PRODUCTION OF Mg(OH)₂
George W. Waldron and John Neil Periard, Bay City, Mich., assignors to The Dow Chemical Company, Midland, Mich., a corporation of Delaware
Filed Mar. 11, 1960, Ser. No. 14,479
11 Claims. (Cl. 23—201)

The invention relates to the production of magnesium hydroxide. It more particularly relates to an improved method of producing magnesium hydroxide by the dolomitic liming of a magnesium chloride-containing inland brine.

This is a continuation-in-part of our copending application S.N. 684,529, filed September 17, 1957, now abandoned.

Magnesium hydroxide is currently produced by a number of processes. One process extensively practiced employs limestone as a starting material. The limestone is calcined to quick lime which is water-slaked to make a calcium hydroxide or slaked lime slurry, the slurry thus made admixed with a magnesium chloride-containing brine in a reaction vessel to form a magnesium hydroxide precipitate in suspension, the precipitate subsequently separated from the mother liquor (usually by filtration), and the thus recovered precipitate washed with water. It may thereafter be dried if a slurry thereof is not desired. The magnesium hydroxide thus produced is generally satisfactory for uses which require a high purity product, e.g., for the manufacture of periclase type refractory products. Other processes used in the production of magnesium hydroxide employ dolomite as a starting material, which is calcined, the oxides water-slaked, the slaked slurry stored for a convenient period of time and then reacted with a magnesium chloride-containing brine to form magnesium hydroxide in suspension, and the magnesium hydroxide thus made recovered and water-washed.

The use of calcined dolomite in the production of magnesium hydroxide has certain inherent advantages over the use of calcined limestone. Among such advantages are the high yield of magnesium hydroxide when dolomite is employed since it itself, when calcined, contains about 1 mole of MgO per mole of CaO and, therefore, when reacted with a magnesium chloride-containing brine and the magnesium oxide becomes hydrated, yields substantially two times the amount of magnesium hydroxide which would be produced from a reaction of calcined limestone with an equal quantity of the brine. Dolomite is relatively plentiful, is found in a substantially high degree of purity, and is often located conveniently near natural brine sources, as for example, in the state of Michigan, U.S.A.

Disadvantages, however, have heretofore been associated with the production of magnesium hydroxide as a precipitate employing dolomite as a raw material, salient among which have been its poor filterability when separating it as a filter cake from the mother liquor and when dewatering it following washing or following reslurrying of the washed cake, the low solids, i.e., the low density of the filter cake produced during filtration (often as low as 30–35 percent solids), and particularly the undesirably high contamination of the product produced from water-slaked dolime unless promptly used, particularly calcium contamination which has also been associated with contamination of the magnesium hydroxide precipitate from ingredients present in the brine, especially chlorides and borates. Dewatering refers to concentrating an aqueous slurry of magnesium hydroxide, commonly carried out by employing a rotary vacuum filter.

Among the larger uses of magnesium hydroxide is the manufacture of periclase-type refractory products which cannot tolerate an appreciable contamination of the magnesium hydroxide. Difficulties arising from contamination by calcium have been particularly troublesome. As much as 1.5 percent calcium oxide in the ignited magnesium hydroxide product is generally considered a maximum contamination for commercial acceptance and not more than 1 percent CaO is preferred. Since a number of large deposits of dolomite are substantially pure, e.g., the Cedarville quarries of Michigan, which by analysis shows it to consist of about 1.03 moles of CaCO₃ per mole of MgCO₃ with a small percent of inerts, the only concern regarding contamination in the use of such dolomite as a source material is calcium contamination of the magnesium hydroxide.

A desideratum therefore exists for a method of making a magnesium hydroxide product employing dolomite and a MgCl₂-containing brine to produce a dense magnesium hydroxide product recoverable by ordinary filtration equipment as a washed filter cake containing at least 45 percent Mg(OH)₂ and preferably more than 50 percent Mg(OH)₂ which is low in impurities.

The invention provides an improved method for the production of magnesium hydroxide which has a high filtration rate for the separation of Mg(OH)₂ as a dense filter cake from the mother liquor and a high density cake of high purity when subsequently washed or washed and reslurried and thereafter dewatered.

The invention accordingly consists essentially of calcining dolomite at not over about 1450° C. to form the oxides; slaking the oxides with a slaking liquid comprising an aqueous calcium chloride solution substantially free of Mg ions and having a specific gravity of at least about 1.07 and preferably not over 1.30 (as measured at about 25° C.) to produce a slaked dolomitic slurry hereinafter referred to as a dolime slurry; intermixing the dolime slurry with a brine containing at least about 2 percent by weight MgCl₂ in an amount sufficient to provide an excess of Ca(OH)₂ in the dolime slurry over the MgCl₂ in the brine for at least about 2 hours for brines of low MgCl₂ concentration and at least about 3 hours for higher concentration brine at a temperature of between 40° and 80° C. to form a precipitate of magnesium hydroxide in suspension which is readily filterable; separating the thus suspended magnesium hydroxide from the mother liquor, as by filtration to produce a high density filter cake; and water-washing the filter cake thus made to produce magnesium hydroxide, sometimes called magnesium hydrate, of high bulk density and high purity wherein the calcium, boron, and chlorine contamination is sufficiently low for the general use thereof, especially for use in the production of periclase by ignition.

The attached drawing illustrates schematically a flow sheet which represents one mode of practicing the invention.

The drawing showing a pulverizer which is used when higher specific gravity calcium chloride brine is employed, and a recycle line from the precipitator to the slaker, which is used when the precipitator slurry is employed as the slaking liquid, is clearly illustrative of a mode of practicing the invention and not to be construed as a limitation.

Referring to the drawing in greater detail there is schematically shown conveyor 10 for conveying dolomite into kiln or calciner 12 from a source of dolomite, not shown. Calcined dolomite from kiln 12 is conveyed by conveyor 14 to cooler 16. From cooler 16, conveyor 18 carries the calcined dolomite (dolime) to a crusher or pulverizer 20 from whence the crushed dolime is taken by conveyor 22 into slaker 24 provided with stirrer 25. Overflow line 26 leads from slaker 24 through pump P, into the top of a reaction vessel, hereinafter called a precipitator, 28, provided with stirrer 29. Brine feed line 30, from a source of brine, not shown, also empties into the top of precipitator 28. Precipitator slurry line 31 leads from an outlet near the top of precipitator 28 and bifurcates into two lines: recycle line 32 leading back to slaker 24 and line 33 leading to a filter pit 34, e.g., one comprising a rack of Moore filters. Filtrate from filter 34 exits through line 35 to evaporator 36. Overhead portable lift 38 moves the filters, to which magnesium hydroxide cake is adhering, from filter pit 34 to wash pit 40 into which fresh water from a source not shown is admitted. Line 41 carries away wash filtrate. Overhead portable lift 42 moves the Moore filters, to which washed magnesium hydroxide cake is still adhering, to storage pit 44 where the magnesium hydroxide is removed and deposited. By suitable arrangement, the same hoist may serve as both 38 and 42.

In practicing the invention, dolomite is calcined to drive off $CO_2$ to yield oxides of calcium and magnesium, i.e., dolime. Calcination is usually carried on at between 1150° and 1450° C. The dolime is thereafter crushed to a suitable size. The particle size is not highly important but is usually less than 2¼-inches. It may include pieces which pass through a 200 mesh sieve or even smaller. The particle size recommended depends in part upon the specific gravity of the calcium chloride slaking liquid. For example, when employing a slaking liquid having a specific gravity greater than 1.15 but not over about 1.30, it is preferred that the dolime be pulverized so that at least about 90 percent will pass through a 20 mesh screen and preferably that it contains particles of such size that at least 25 percent will pass through a 100 mesh screen and at least about 15 percent through a 200 mesh screen. When employing a specific gravity of between about 1.07 and 1.15, no particular advantage is seen in employing the finely pulverized dolime but larger pieces are satisfactory, pieces ranging between ½ inch and 2¼ inches usually being used. It has been observed that when the slaking liquid has a specific gravity greater than about 1.15 the dolime slurry produced in the slaker tends to contain some undispersed lumps, due apparently to the slow slaking rate in the higher specific gravity calcium chloride solutions. A calcium chloride slaking liquid having a specific gravity greater than about 1.3 may be used but slaking liquids having specific gravities greater than 1.3 indicate a need for a smaller particle size dolime and a longer slaking time with no apparent advantage since available brines employed produce a mother liquor for slaking having a specific gravity of not over 1.3.

The slaking time recommended is between 4 minutes and 3 hours dependent in part on the temperature and type of agitation provided in the slaker. The preferred time is between 0.1 and 0.5 hour since the shorter time produces a higher density cake having better filtering properties. For example, a slaking period of 0.1 hour produced a 63 percent solids cake whereas a 1.5 hour slaking period produced a 56 percent solids cake. However, a satisfactory density cake can be produced employing a slaking time of 4 to 6 hours or even longer. It is clear, however, that in view of no apparent advantage in a prolonged slaking period, efficiency and practicality would indicate the employment of the shorter slaking period. The temperature in the slaker is usually between 40° and 90° C. The slaker may be any one of known types of mixers, e.g., either a rotating cylindrical type slaker provided with baffles or balls or a tank type (as shown in the drawing) provided with a high speed agitator, e.g., of the impeller type. The slaking liquid is an aqueous solution containing sufficient calcium chloride to provide the specific gravity set out above. It may be a freshly made up solution, or calcium chloride mother liquor, either the slurry containing magnesium hydroxide suspended therein from the precipitator or the substantially clear filtrate recycled back from the filtration step in the operation. If the recycled calcium chloride filtrate or mother liquor of the magnesium hydroxide slurry has a higher specific gravity than is desired, it may be readily diluted to the desired specific gravity by merely introducing a flow of water into the slaker along with the calcium chloride filtrate or slurry.

The ratio of slaking liquid to dolime in the slaker should be such as to provide adequate intermixing of the dolime and calcium chloride solution but avoid recycling an unnecessarily large volume of liquid, and to result in a dolime slurry which is easily pumped. The slaker feed ratio is usually between about 0.8 and 3.3 pounds of dolime per gallon of slaking liquid. Dolime concentrations below this ratio are acceptable but represent an undesirably large recycle stream. Higher concentrations than this ratio in the slaker tend to cause the temperature thereof to rise above the 90° C. upper limit. At such higher temperatures, there appears to be a tendency to form calcium oxychloride crystals which coat the slaker surface.

The dolime slurry is led from the slaker and introduced into the precipitator concurrently with a magnesium chloride-containing brine. The dolime slurry is preferably led directly to the precipitator without undue delay after it is prepared. Where the slurry is not transferred to the precipitator for a period of several hours there is a tendency for the final magnesium hydroxide product to have a lower density than is desirable. The precipitator, e.g., 28, is usually an open top vessel equipped with baffles and an agitator, e.g., 29, which is of such size and rotates at a speed sufficiently high to keep the contents of the precipitator well mixed. To illustrate suitable agitation, a 300-gallon precipitator (having a diameter of 48 inches and a depth of about 38 inches) may employ an agitator which requires a power load of between 0.5 and 0.6 net watt per gallon of precipitation slurry in the precipitator. In larger tanks, such as one having a diameter of 40 feet and a depth of 40 feet, the power required for agitating is between about 0.25 and 0.3 net watt per gallon. By net watt is meant the power employed for agitation exclusive of that necessary to turn the stirring mechanism at the same speed in an empty precipitator. For best results, both the magnesium chloride-containing brine and the dolime slurry are fed through separate pipes which discharge into the precipitator, preferably at positions on opposite sides of the agitator so that both the dolime and the brine are effectively diluted with precipitator slurry before intermixing and reacting with each other.

An excess of calcium hydroxide from the dolime slurry, i.e., more than 1 mole of $Ca(OH)_2$ per mole of $MgCl_2$, is always maintained in the precipitator. A very slight excess is preferred. Methods of maintaining the desired excess of $Ca(OH)_2$ consists usually of periodically checking either the soluble alkalinity or the pH of the contents of the precipitator.

A recommended practice is to determine quantitatively the relative amounts of brine and dolime necessary to insure a slight excess of $Ca(OH)_2$ over the $MgCl_2$ and thereafter correlate the desired excess with either the pH value or the soluble alkalinity value of the mother liquor. Soluble alkalinity is readily ascertained by titrating a given volume of mother liquor with 0.1 N hydrochloric acid to a phenolphthalein end point and recording the soluble alkalinity as the number of cc. of 0.1 N hydrochloric acid required. The residence or dwell time, herein usually denoted as inventory time, in the precipitator is an important factor in producing magnesium hydroxide of high quality according to the invention. Inventory time in the precipitator may be expressed as the average time in hours that a pound of $Mg(OH)_2$ is suspended in the precipitator. In other words, it is equal to the pounds of $Mg(OH)_2$ in suspension in the precipitator divided by the pounds of $Mg(OH)_2$ being produced per hour. The inventory time may also be based on volume and expressed as the average time in hours obtained by dividing the volume of the precipitator in gallons by the gallons of overflow slurry produced per hour in the practice of the invention. Between 3 and 20 hours are usually employed. Where the inventory time is less than 2 hours, the rate of precipitation in proportion to the seed crystals of magnesium hydroxide in the precipitator appears to be too high to form the desired particles for filtration and dewatering. As a result thereof, the cake density decreases sharply as the time is shortened below about 2 hours. Too short an inventory time, furthermore, does not provide sufficient time for the larger dolime particles to react with the magnesium chloride in the brine. Therefore, an increase in calcium contamination in the magnesium hydroxide product results. An inventory time beyond 25 hours is not recommended because it entails larger precipitators and higher agitation power costs without commensurable returns.

The temperature maintained in the precipitator is between 40° and about 80° C. A small amount of steam may advantageously be introduced into the precipitator to maintain a substantially constant temperature for more easily controlling the precipitation step. At temperatures of less than 40° C. the reaction time is unsatisfactorily slow. Temperatures above 80° C. may be employed but heating costs become significant at such temperatures and as the temperatures approach the boiling point, the increased evaporation from an open-top precipitator is undesirable.

A convincing qualitative test for insurance that there is an excess $Ca(OH)_2$ in the precipitator over the $MgCl_2$ necessary to react therewith for the purposes of confirming the pH or soluble alkalinity tests, consists of testing a small portion of the mother liquor from the slurry by adding thereto a few drops of the $MgCl_2$-containing brine. The presence of a small amount of soluble $Ca(OH)_2$ slowly produces a milky or slightly turbid condition within about a minute. An amount of $Ca(OH)_2$ is thereby shown to be present in the precipitator in excess of the stoichiometric equivalent of the $MgCl_2$ which, stated in other words, requires that substantially all the $MgCl_2$ in the precipitator be completely reacted to form magnesium hydroxide leaving a slight excess of unreacted $Ca(OH)_2$ in solution. A large excess of $Ca(OH)_2$ is not employed because, with an increase thereof beyond that necessary to react completely with the $MgCl_2$ present to form a precipitate of magnesium hydroxide, there is an increase in the calcium impurities in the product being produced.

The magnesium hydroxide slurry so produced in the precipitator is usually led off through an over-flow line positioned near the top of the precipitator as shown in item 28 of the drawing. Such overflow line in commercial practice leads into a filtration means, e.g., a vacuum type filter, and there filtered leaving the magnesium hydroxide as a cake. The filtrate is drawn off and the salts contained therein, particularly the $CaCl_2$, are recovered therefrom. The $Mg(OH)_2$ is then water-washed, and often reslurried for convenience in transportation, and subsequently dewatered prior to use. For purposes of illustration, the slurry is recovered and the filtrate is usually merely discarded. The cake thus recovered, as in commercial practice, is washed with water to remove entrained mother liquor and thereafter reslurried to make it pumpable and subsequently dewatered to a satisfactory concentration, e.g., a cake having a total solids of at least 45 percent and preferably 55 to 60 percent.

In the practice of the invention, the slaking liquid may be any $CaCl_2$-containing aqueous liquid, e.g., a freshly made up $CaCl_2$ aqueous solution. A preferred practice of the invention, however, employs either some of the slurry from the precipitator which is recycled back into the slaker, carrying along the magnesium hydroxide suspended therein in the recycling operation or employs the portion of the filtrate from the filtration operation which is piped back to the slaker in a similar manner to that of the slurry.

The following series of runs were made, including runs which are illustrative of the practice of the invention, designated examples, and some which were not made according to the invention but for purposes of comparison and are so designated.

A typical analysis of the dolomite employed in all runs, when ignited to the oxides, showed the following percentage composition: 57.5 percent CaO, 40.0 percent MgO, and 2.5 percent inerts An analysis of a typical brine employed in the runs of Series One showed the following salts dissolved therein by weight: 16.7 percent $CaCl_2$, 9.4 percent $MgCl_2$, 2.70 percent NaCl, 0.96 percent KCl, and lesser amounts of other salts including those of Sr, Li, B, and Fe. Its specific gravity was 1.28.

SERIES ONE

This series was made to illustrate the effects of employing a $CaCl_2$-containing slaking liquid according to the invention in contrast to employing water as a slaking liquid in the production of magnesium hydroxide from dolomite and a $MgCl_2$-containing brine. Run A employed water for purposes of comparison. Examples 1 and 2 employed a $CaCl_2$-containing slaking liquid and differed from one another in that the liquid employed in Example 1 had a specific gravity of over 1.07 but less than 1.15 and that employed in Example 2 had a specific gravity of between 1.15 aad 1.3.

Calcined dolime and a slaking liquid, either the water or the aqueous $CaCl_2$ liquid, were fed into a continuously operated rotating cylindrical slaker provided with baffles in run A and Example 1 and in all other runs and examples into a slaker of the type illustrated schematically in the drawing by numeral 24. Feed rates were maintained to provide the ratios of dolime to liquid and the slaking inventory times are shown in Table I set out hereinafter. The slaked dolime slurry was led from the slaker to a precipitator, one type shown schematically in the drawing as numeral 28. Concurrently with the dolime slurry, brine was admitted at a controlled rate through line 30 to the precipitator, the brine rate being controlled to maintain an excess of $Ca(OH)_2$ over the stoichiometric quantity required to react with the $MgCl_2$ in the brine. Precipitated magnesium hydroxide in suspension was formed in the precipitator leaving a substantially magnesium-free mother liquor. Overflow slurry from precipitator 28 flowed out through line 31, a portion of which returned to slaker 24 through line 32 to provide slaking liquid in Examples 1 and 2, and the balance of the slurry drawn off through line 33 for subsequent filtration for the recovery of magnesium hydroxide cake from the $CaCl_2$-containing mother liquor. In Example 1 some water was fed into the slaker along with the recycled slurry to reduce the specific gravity of the slaking liquid. (The specific gravity of the slaking liquid refers to that of the mother liquor only and does not consider the suspended magnesium hydroxide therein which does not enter into the slaking action but is merely carried along for convenience.) The magnesium hydroxide precipitate was recovered as a cake as by periodically passing the slurry into a Buchner funnel subjected to a reduced absolute pressure of 6 inches of Hg instead of the commercial filters suggested by item 34 of the drawing. The magnesium hydroxide cake is water-washed on the funnel to provide a cake free of mother liquor. Since, in common practice, the washed cake is usually admixed with enough water to produce a pumpable slurry, the washed cake in this series was therefore sometimes slurried and subsequently dewatered, employing the dewatering test referred to in footnote (8) of Table I. The filtrate was discarded, although in practical operations the filtrate, is usually subjected to evaporation, e.g., in evaporator 36, to recover the dissolved salts therein, particularly the CaCl₂.

The slaking and precipitating conditions and the more important characteristics of the precipitated product produced are shown in Table I set out following Series Two below.

An examination of the results of run A and Examples 1 and 2 of Table I shows a number of facts which are pertinent to the superiority of the method of the invention employing $CaCl_2$ solution as the slaking liquid instead of water, among which are: improved filtration rate and higher percent $Mg(OH)_2$ in the cake produced during filtration and improved dewatering rate and higher percent solids after admixing the washed cake with water (which was done to simulate frequent actual practice). The percent calcium contamination in the final cake is comparable for the three runs, e.g., 0.62–0.94 CaO when employing water as compared to 0.5–0.9 CaO when employing a $CaCl_2$-containing slaking liquid having specific gravity of 1.3. It should be noted that blank A, which was run for comparative purposes (employing water as the slaking liquid rather than a $CaCl_2$ solution as required by the practice of the invention), although not a practice of the invention, was not in accordance with general practice, and gave a $Mg(OH)_2$ product of low calcium impurity. Blank A was not fully satisfactory because of its less desirable filterability. Blank A differed from general practice in that the dolime slurry was passed directly and without delay into the precipitator to avoid any substantial slaking of the MgO of the dolime prior to entering the precipitator as described in our copending application S.N. 684,421, filed September 17, 1957.

SERIES TWO

A series of runs was made to illustrate the effect of variations in inventory time in the precipitator. The series consists of two comparative runs, designated B and C and Examples 3, 4, and 5 of the invention. Dolime employed in the runs of Series Two showed the same analysis as that set out above and employed in Series One. The brine, however, employed in Example 3 of Series Two was the same as that employed in Series One, for which a typical analysis is set out above. The brine employed in the remaining runs of Series Two, viz., comparative runs B and C and Examples 4 and 5, showed by a typical analysis to contain the following salts dissolved therein, by weight: 17.5 percent $CaCl_2$, 3.3 percent $MgCl_2$, 5.0 percent NaCl, 1.8 percent of KCl, and lesser amounts of other salts including those of Sr, Li, B, and Fe. Its specific gravity was 1.26. The procedure followed in Series Two for both blank runs and examples was similar to Examples 1 and 2 of Series One except that in blanks B and C, less than the inventory time considered satisfactory for the purposes of the invention was followed whereas in Examples 3, 4, and 5, the inventory time was sufficient to insure the attainment of the objectives of the invention. It will be observed in evaluating the runs of this series that an inventory time in the precipitator of about 2 hours is satisfactory when the brine employed contains about 9.0–9.5 percent $MgCl_2$ whereas at least about 3 hours precipitator inventory time is required when the $MgCl_2$ content of the brine is about 3.0–3.5 percent.

The pertinent operating conditions and results are set out in Table I.

*Table I*

| | Series one | | | Series two | | | | |
|---|---|---|---|---|---|---|---|---|
| | Comparative run A | Examples | | Comparative runs | | Examples | | |
| | | 1 | 2 | B | C | 3 | 4 | 5 |
| Duration of run, days | 18 | 7 | 13 | 2 | 4 | 5 | 7 | 7 |
| Temperature in slaker, °C | 75–78 | 70–75 | 74–77 | 70 | 71–73 | 74–91 | 65–70 | 63–77 |
| Slaker inventory time, minutes [1] | 50 | 20 | 8 | 8–9 | 13 | 6–8 | 7–8 | 4–9 |
| Pounds of dolime per gallon slaking liquid | 2.4–2.8 | 1.2–1.3 | 1.4–1.7 | 1.1–1.2 | 1.1–1.2 | 1.5–1.9 | 1.4–1.7 | 1.3–1.9 |
| Particle size of dolime to slaker [2] | (a) | (a) | (b) | (b) | (b) | (b) | (b) | (b) |
| Kind of slaker liquid feed [3] | (c) | (d) | (e) | (e) | (e) | (e) | (e) | (d) |
| Sp. gr. of slaker liquid feed at 25° C | 1.0 | 1.09–1.11 | 1.3 | 1.27 | 1.27 | 1.3 | 1.27 | 1.10–1.14 |
| Temperature in precipitator, °C | 57 | 57 | 67 | 57 | 57 | 77 | 51 | 57 |
| Precipitator inventory time, hours | 15 | 14–15 | 20–21 | 1.3 | 2.1 | 2.1 | 6.5 | 3.4 |
| Ratio of Ca(OH)₂ to MgCl₂ in precipitator.[4] | (f) | (f) | (f) | (f) | (f) | (f) | (f) | (f) |
| Pounds Mg(OH)₂ product per hour | 15–18 | 16–17 | 16–18 | 7.8 | 5.1 | 16–17 | 15.5–16.5 | 660–690 |
| Sp. gr. of filtrate from filter at 25° C | 1.206–1.216 | 1.203–1.211 | 1.29–1.32 | 1.27 | 1.27 | 1.27–1.29 | 1.24–1.26 | 1.24 |
| Filtrate rate of slurry, gal./hr./sq. ft.[5] | 7–9 | 10–11 | 14–19 | 30 | 30 | 10–18 | 14–16 | 15–17 |
| Percent Mg(OH)₂ in washed cake [6] | 51.5–52.8 | 59–60 | 59–61 | 35 | 36 | 58–64 | 56–58 | 56–59 |
| Percent CaO in ignited washed cake | 0.62–0.94 | 0.8–0.9 | 0.5–0.9 | 1.4 | 1.2 | 0.7–1.6 | 0.7–1.0 | 1.0–107 |
| Percent Mg(OH)₂ in water slurried washed cake. [7] | 46 | 52 | 51 | (g) | (g) | (g) | 45.5 | 51.6 |
| Dewatering rate in pounds of Mg(OH)₂/hr./ft.² | 25–50 | 211 | 250–325 | (g) | (g) | (g) | 142 | 144 |
| Percent Mg(OH)₂ in dewatered cake [8] | 56 | 61.5 | 60.6 | (g) | (g) | (g) | 58.2 | 63.3 |

[1] Calculated as volumetric inventory as follows: $\frac{\text{gallons in slaker}}{\text{gallons/hour through slaker}} \times 60$.

[2] "Crushed," containing up to ¼" size particles with 23–34 percent remaining on a No. 20 mesh sieve. "Pulverized," at least 90 percent through a 20 mesh sieve, at least 67 percent through a 100 mesh sieve, and at least 42 percent through a 200 mesh sieve.

[3] Slurry means precipitator slurry, primarily $CaCl_2$ solution containing $Mg(OH)_2$ in suspension.

[4] Soluble alkalinity as cc. of N/10 HCl required to titrate 100 cc. of mother liquor to a phenolphthalein end point was 10–12 in Series One. This conclusively shows an excess of Ca(OH)₂ from the dolime over the MgCl₂ from the brine because a stoichiometric equivalent amount of each employing this brine gives a solubility alkalinity of 2 cc. Therefore, the excess of about 9 cc. alkalinity can be calculated to show that an additional 0.033 percent MgCl₂ would have been necessary to react with all the Ca(OH)₂ present. Excess Ca(OH)₂ in Series Two was shown by adding a few drops of MgCl₂ brine to samples of clear precipitator mother liquor which produced milky turbidity and thereafter maintaining a solubility alkalinity which insured this slight Ca(OH)₂ excess.

[5] Determined by filtering precipitator slurry through a Buchner funnel with 24″ mercury vacuum, to a 1″ thick recovered Mg(OH)₂ cake.

[6] Percent Mg(OH)₂ determined by titration of a weighed sample of cake with N/1 HCl and back titrating with N/1 NaOH solution to the phenolphthalein end point and calculating the percent Mg(OH)₂ as follows:

$$\frac{0.02917 \times \text{net cc. of 1.0 N HCl}}{\text{grams of sample}} \times 100$$

[7] In accordance with general practice, washed filter cake had water added to make a thick but pumpable slurry and was subsequently dewatered. The final solids of the dewatered cake obtainable without a protracted dewatering operation is usually just slightly higher than that obtained in the washed filter cake.

[8] Determined according to standard dewatering test as described in Perry's Handbook, 3rd Edition, 1950, page 969, published by McGraw-Hill, New York, New York.

a Crushed.   b Pulverized.   c Water.   d Water and slurry.   e Slurry.   f A slight excess of Ca(OH)₂ over MgCl₂ was maintained.   g Not determined.

An evaluation of the table clearly shows that a dolime slurry prepared by slaking dolime with a calcium chloride-containing solution or slurry and the slaked dolime reacted with a MgCl₂-containing brine maintaining an excess of calcium hydroxide over the MgCl₂ in the reaction vessel and an inventory time of at least 2 hours for the brine containing at least about 9 percent MgCl₂ and an inventory time of at least about 3 hours for the brine containing not over about 3.5 percent MgCl₂ produces a magnesium hydroxide product which is more readily filtered, washed and dewatered, and is less calcium contaminated. Furthermore, it can be easily seen that the by-product CaCl₂-containing filtrate, is suitable for direct recovery of CaCl₂ therefrom whereas the presence of MgCl₂ in the filtrate is objectionable since it decomposes during drying to form HCl and MgO. The MgO thus formed therein produces a turbid CaCl₂ solution when the CaCl₂ product is subsequently dissolved in water. To render the filtrate, which contains unreacted MgCl₂, suitable for general use, it is necessary to add an alkali and refilter, a costly and definitely undesirable step. Furthermore, magnesium hydroxide formed by a reaction wherein the Ca(OH)₂ is not in excess of the MgCl₂, a product is formed from which it is difficult if not impossible to remove chlorides by ordinary washing thereby rendering the product unfit at least for refractory uses.

It is also clear that where boron compounds appear in the brine, as is not infrequent, a failure to have a slight excess of Ca(OH)₂ in the precipitator in some way causes an increase in adsorption of both boron compounds and chlorine compounds in the magnesium hydroxide product. Tests have been run to show that when there is no excess of Ca(OH)₂ over the MgCl₂ in the precipitator, the boron and chlorine content of the Mg(OH)₂ product produced was definitely increased over such contamination when an excess of Ca(OH)₂ was maintained. For example, where it was known that the stoichiometric quantity of Ca(OH)₂ for a specific brine (as determined by measuring the soluble alkalinity of 100 cc. of precipitator mother liquor by titrating it with 0.1 N hydrochloric acid to a phenolphthalein end point) gave a soluble alkalinity of 20 cc. of the acid, such 20 cc. soluble alkalinity value resulted in a boron content in excess of 0.9 percent, calculated as percent B₂O₃, based on the weight of the ignited Mg(OH)₂ product made. But when the soluble alkalinity of 100 cc. of the precipitator mother liquor required 24 cc. of 0.1 N acid, the boron contamination of the ignited Mg(OH)₂ was reduced to less than 0.5 percent and when the soluble alkalinity of 100 cc. of the precipitator mother liquor was increased to require 30 cc. of 0.1 N acid (indicating slightly greater excess of Ca(OH)₂ over MgCl₂) the boron content calculated as percent B₂O₃ was less than 0.25 percent.

Similarly, when the soluble alkalinity of 100 cc. of the precipitator mother liquor (employing the same brine as above and titrated as above) required 20 cc. of 0.1 N hydrochloric acid, the total chlorine contamination calculated as percent CaCl₂, of the dried Mg(OH)₂ product, exceeded 0.62 percent. When the soluble alkalinity of 100 cc. of precipitator mother liquor was increased to require 24 cc. of 0.1 N hydrochloric acid, the chlorine contamination, as CaCl₂, was less than 0.39 percent of the dried Mg(OH)₂ product.

Therefore, among the advantages of the practice of the invention is the decreased contamination by boron and chlorine compounds both of which are definitely undesirable for use of magnesium hydroxide in products requiring high purity ingredients.

The following example was run to illustrate further the practice of the invention and to show in detail the significance of practicing the invention as described.

EXAMPLE 6

Dolomite having the composition set forth hereinbefore and brine having the composition set forth hereinbefore were employed in this example.

The example was run for 20 days during which periodic checks and tests were run to ascertain operating conditions and evaluate the quality of the magnesium hydroxide cake being produced.

The dolomite was fed into a rotary cylindrical kiln represented by item 12 of the drawing which was inclined downwardly toward the outlet end and fired by a mixture of pulverized coal and natural gas forced in the outlet end thereof. The kiln was operated between 1300° and 1365° C. Dolime thus produced was carried by conveyor 14 to cooler 16 where it was cooled to below about 80° C. The cooled dolime was conveyed by a screw conveyor to pulverizer 20 which subdivided the dolime into a powder which was periodically sampled and tested for screen analysis. The range of percent and the average percent of various size ranges for a number of samples of pulverized dolime used are set out below and may be considered typical for use with high specific gravity brine.

| Mesh (U.S. Standard Sieve Series) | Weight percent | |
|---|---|---|
| | Range | Average |
| +20 | 0 | |
| 20 to 40 | 0.4 to 4.3 | 3 |
| 40 to 60 | 1.7 to 11.3 | 3 |
| 60 to 80 | 0.5 to 20.0 | 6 |
| 80 to 100 | 0.7 to 11.0 | 2 |
| 100 to 200 | 4.0 to 29.0 | 18 |
| −200 | 50.0 to 85.0 | 68 |
| | | 100 |

It can be seen from the above average percents that smaller than a 100 mesh sieve is 18+68 or 86 percent.

The pulverized dolime was conveyed to slaker 24 where the dolime was slaked with the CaCl₂-containing slurry entering from lime 32. The mixing action was aided by a high-speed stirrer. The principal slaker conditions employed in this example consisted of a flow of dolime of between about 14 and 16 pounds per hour and a flow of precipitator slurry thereto of about 9.75 gallons per hour, a slaker temperature of about 75° C. The slaker inventory time was 1.1 hours (calculated by adding the dolime and slaker liquid, i.e., by dividing the operating capacity of the slaker by the input per hour). The principal precipitator conditions consisted of admitting an overflow from the slaker into a precipitator having a capacity of 300 gallons and simultaneously therewith a continuous flow of 1.28 specific gravity brine, having the analysis set out hereinabove. The average dolime slurry flow thereinto was 15.0 pounds per hour and the brine thereinto was controlled at an average of 14.1 gallons per hour to produce a soluble alkalinity so that 100 cc. of the mother liquor therein required between 10.2 and 11.4 cc. of 0.1 N HCl acid to titrate it to a phenolphthalein end point. The precipitator temperature was about 67° C. The normality of the magnesium hydroxide slurry produced as about 4.5 N.

Overflow line 31 from precipitator 28, leading into line 32, carried a portion of precipitator slurry back to slaker 24 to provide the CaCl₂ slaking liquid.

The mathematical evaluation of the precipitator conditions of Example 6 set out below shows that (A) an excess of Ca(OH)₂ over the MgCl₂ therein was maintained and (B) an inventory time in excess of the minimum required by the practice of the invention was maintained (the MgO content of the calcined dolomitic aqueous slurry, does not enter into the reaction and, accordingly, is not a factor in the calculation of the reaction quantities of dolime and MgCl₂-containing brine in the precipitator).

(A) The ratio of Ca(OH)₂, as CaO, may be calculated as follows:

(1) Since the rates of flow during the operations were

*15.0 pounds*/hour of dolime and *14.1 gallons*/hour of brine; (2) since the specific gravity of the brine was 1.28 and the weight of a gallon of water is 8.345 *pounds/gallon*, the weight of a gallon of brine is readily determined by multiplying *1.28×8.345*; (3) since the fractional weight of $MgCl_2$ in the brine is *0.094* $MgCl_2$ or 9.40 percent; (4) since the analysis of the dolime was 57.5 weight percent CaO and 40.0 weight percent MgO; (5) since the molecular weight of $MgCl_2$ is 95.23 and the molecular weight of CaO is 56.08; then by employing the italicized values above as the numerator, the underlined values as the denominator, canceling out, and calculating thus:

$$\frac{14.1 \text{ gal.}}{\text{hr.}} \times 1.28 \times \frac{8.345 \text{ lb.}}{\text{gal.}} \times 0.094 \text{ MgCl}_2 \times \frac{\text{moles}}{95.23 \text{ lb.}}$$

it is shown that an average of 0.1478 mole $MgCl_2$/hour was fed into the precipitator. Further calculating thus:

$$\frac{15.0 \text{ lb.}}{\text{hr.}} \times 0.575 \text{ CaO} \times \frac{\text{moles}}{56.08 \text{ lb.}}$$

it is further shown that an average of 0.1538 mole CaO/hour was fed into the precipitator. Subtracting as follows:

```
  0.1538 mole CaO
 -0.1478 mole MgCl2
 ──────────────────
  0.0060 mole excess of CaO    or  .006/0.1478 × 100
                                     = 4.05% excess CaO
``` thereby showing that CaO was continuously added in excess of the $MgCl_2$ fed to the precipitator.

(B) The inventory time of the dolime and the $MgCl_2$-containing brine in the precipitator may be calculated as follows: (1) since the operating capacity of the precipitator was 300 gallons and the overflow or outgoing volume of $Mg(OH)_2$ slurry from the precipitator to the filter was *15.0 gallons per hour*, the calculated volume not including the volume of slurry which was recycled back to the slaker and did not enter into the recovery, the average inventory time, therefore, was:

$$\frac{300 \text{ gal.}}{15 \text{ gal./hr.}} \text{ or 20 hours}$$

Proceeding with Example 6 following the reaction in the precipitator, the major portion of the overflow slurry from the precipitator was carried by line 33 to a collecting vessel and periodically passed into a Buchner funnel where the suspended magnesium hydroxide was removed for evaluation. The slurry filtered rapidly, having a filter rate of 14 to 18 gal. per hr. per ft.$^2$, to produce a high density washed cake containing 53 to 58 percent $Mg(OH)_2$ solids. (In commercial operations, the magnesium hydroxide slurry would have followed the general course suggested by the Moore filters, washer, and evaporator shown in the drawing.) The magnesium hydroxide recovered on the Buchner was washed to remove entrained $CaCl_2$ mother liquor and thereafter dried, ignited to dryness, and analyzed for oxides of Ca, Si, Al, and Fe. Twelve samples in all were taken on different days. The highest Ca content, calculated as CaO of any sample was 0.853 percent, the lowest 0.522 percent. A total of five samples taken on different days showed the sum of the oxides of Al and Fe to vary between 0.95 and 0.53 and $SiO_2$ to vary between 0.87 and 0.67. The analysis of the magnesium hydroxide produced, therefore, showed it to be of high purity suitable for meeting premium quality specifications for use in making periclase-type products.

Thus it is seen that by calcining dolomite, preferably at a temperature between 1150 and 1450° C., slaking the calcined dolomite with a liquid comprising an aqueous solution of $CaCl_2$ having a specific gravity of at least 1.07 and preferably between 1.15 and 1.3 (providing the dolomite is of a satisfactory fineness as aforedescribed), at a temperature of between 30° and 90° C. and usually between 0.1 and 1.5 hours to produce a slaked dolime slurry, intermixing the slaked dolime slurry with a $MgCl_2$-containing brine containing at least 2 percent by weight $MgCl_2$ at a temperature between 40° and 80° C. for at least 3 hours when the brine employed contains not over about 3.5 percent $MgCl_2$ and at least 2 hours when the brine contains higher percents of $MgCl_2$ while maintaining an excess of $Ca(OH)_2$ over the $MgCl_2$, which is preferably a slight excess, a magnesium hydroxide slurry is produced from which the precipitate is readily separated by filtration, readily washed, and readily dewatered (if reslurried with water following washing) to yield to a high density magnesium hydroxide product of high purity suitable for uses requiring less than 1.5 and even less than 1.0 percent Ca therein calculated as percent CaO in the dehydrated ignited cake, and a valuable substantially magnesium-free $CaCl_2$ filtrate.

Having described the invention, what is claimed and desired to be protected by Letters Patent is:

1. The process of producing magnesium hydroxide cake of high density and high purity which may be slurried in water and readily dewatered by filtration means consisting essentially of calcining dolomite to produce dolime, slaking the dolime with a slaking liquid comprising an aqueous $CaCl_2$ solution substantially free of Mg ions and the liquid portion thereof having a specific gravity of at least 1.07, at a temperature of between 40° and 90° C. for at least about 4 minutes, to produce a slaked dolime slurry, and intermixing the dolime slurry so produced with a brine containing at least about 2 percent by weight of $MgCl_2$ for a mixing period of at least about 2 hours at a temperature of between 40° and about 80° C., the amount of the dolime slurry being sufficient to provide more than one mole of $Ca(OH)_2$ per mole of $MgCl_2$ to produce magnesium hydroxide suspended in a $CaCl_2$-containing brine, and recovering the thus produced magnesium hydroxide.

2. The method of claim 1 wherein the dolime has a particle size such that at least about 90 percent will pass through a No. 20 mesh sieve, at least about 25 percent will pass through a 100 mesh sieve, and at least about 15 percent will pass through a 200 mesh sieve.

3. The method of claim 1 wherein the dolomite has a particle size of not over about 2½ inches and the aqueous $CaCl_2$ solution has a specific gravity of at least 1.07 and not over about 1.15.

4. The method of claim 1 wherein the calcining temperature is between 1140° and 1450° and the slaking period is between 0.1 and 0.5 hour.

5. The method of claim 1 wherein the slaked dolime slurry is brought into contact with the brine for intermixture and reaction therewith within about 90 minutes after the slaking period.

6. The method of claim 5 wherein said reaction is carried on at a temperature between about 60° and 75° C.

7. In a method of producing magnesium hydroxide from calcined dolomite and an aqueous magnesium chloride solution the improvement consisting of slaking the calcined dolomite with a liquid containing $CaCl_2$ in solution and substantially free of Mg ions, intermixing the resulting mixture of slaked calcined dolomite and aqueous solution with a brine containing at least about 2 percent by weight of $MgCl_2$ for at least about 2 hours, when the brine employed contains more than 3.5 percent by weight $MgCl_2$ and an inventory time of at least 2 hours when the brine contains not more than 3.5 percent by weight $MgCl_2$, while maintaining a slight stoichiometric excess of $Ca(OH)_2$ over the $MgCl_2$ therein, separating the magnesium hydroxide so produced from the resulting $CaCl_2$-containing mother liquor, water washing the separated magnesium hydroxide, and removing from the separated magnesium hydroxide excess water to produce a high density magnesium hydroxide which is low in Ca, Cl, and B contamination.

8. The method of claim 7 wherein the slight excess of $Ca(OH)_2$ is determined by conducting periodic soluble alkalinity tests on the mother liquor.

9. The method of producing magnesium hydroxide from particulate dolime and a $MgCl_2$-containing brine consisting essentially of slaking the dolime with mother liquor produced when the slaked dolime is subsequently reacted with the $MgCl_2$-containing brine containing at least 2 percent by weight $MgCl_2$, said mother liquor having a specific gravity between about 1.07 and 1.15 when the dolime has a particle size of less than 2¼ inches and having a specific gravity of between 1.07 and about 1.30 when the dolime has a particle size of such that at least 90 percent will pass through a No. 20 mesh sieve, 25 percent through a 100 mesh sieve, and 15 percent through a 200 mesh sieve, intermixing the slaked dolime with the $MgCl_2$ brine for at least 2 hours when the brine has a $MgCl_2$ content of over 3.5 percent by weight and at least about 3 hours when the brine has a $MgCl_2$ content of less than 3.5 percent, at a temperature between 40° and 90° C., while maintaining an excess of $Ca(OH)_2$ over the stoichiometric quantity of $MgCl_2$ required to react with the $Ca(OH)_2$, to produce a slurry of magnesium hydroxide suspended in the $CaCl_2$-containing mother liquor, the magnesium hydroxide separated from the mother liquor, and water-washing the magnesium hydroxide separated.

10. The method of claim 9 wherein the slaking liquid is the mother liquor containing magnesium hydroxide suspended therein.

11. The method of claim 9 wherein the slaking liquid is the mother liquor recovered as filtrate during the separation of magnesium hydroxide therefrom.

References Cited in the file of this patent
UNITED STATES PATENTS
2,465,264    Pike _____ Mar. 22, 1949

UNITED STATES PATENT OFFICE
CERTIFICATE OF CORRECTION

Patent No. 3,080,215                              March 5, 1963

George W. Waldron et al.

It is hereby certified that error appears in the above numbered patent requiring correction and that the said Letters Patent should read as corrected below.

Column 12, line 65, for "2 hours" read -- 3 hours --.

Signed and sealed this 19th day of November 1963.

(SEAL)
Attest:

ERNEST W. SWIDER

Attesting Officer

EDWIN L. REYNOLDS

Acting Commissioner of Patents